United States Patent [19]

Takeuchi et al.

[11] Patent Number: 4,779,592
[45] Date of Patent: Oct. 25, 1988

[54] STEPPING MOTOR AND INTAKE CONTROL APPARATUS THEREWITH

[75] Inventors: Kanji Takeuchi, Gamagori; Yosuke Setaka, Anjo, both of Japan

[73] Assignee: Nippondenso Co., Ltd., Kariya, Japan

[21] Appl. No.: 128,216

[22] Filed: Dec. 3, 1987

[30] Foreign Application Priority Data

Dec. 5, 1986 [JP] Japan ................. 61-291113

[51] Int. Cl.4 ............................ F02D 9/08
[52] U.S. Cl. ......................... 123/399; 180/197
[58] Field of Search ............... 123/361, 399; 180/197;
310/49 R, 67 R, 114, 115, 116

[56] References Cited

U.S. PATENT DOCUMENTS

| 859,368 | 7/1907 | Collins | 310/115 |
|---|---|---|---|
| 2,864,017 | 12/1958 | Waltscheff | 310/115 X |
| 3,221,191 | 11/1965 | Cuches et al. | 310/49 R X |
| 3,944,865 | 3/1976 | Jewitt | 310/114 X |
| 4,367,805 | 1/1983 | Totani et al. | 180/179 |
| 4,375,047 | 2/1983 | Nelson et al. | 310/114 X |
| 4,523,565 | 6/1985 | Omitsu | 123/399 |
| 4,532,447 | 7/1985 | Cibié | 310/49 R X |
| 4,586,471 | 5/1986 | Horada et al. | 123/399 |
| 4,681,374 | 7/1987 | Nakamura et al. | 180/197 X |
| 4,714,864 | 12/1987 | Yogo et al. | 180/197 X |
| 4,724,811 | 2/1988 | Maisch | 123/399 X |

FOREIGN PATENT DOCUMENTS

| 0089492 | 2/1983 | European Pat. Off. | |
| 117859 | 11/1974 | Japan . | |
| 116140 | 7/1982 | Japan . | |
| 122742 | 7/1984 | Japan | 123/399 |

Primary Examiner—Tony M. Argenbright
Assistant Examiner—Eric R. Carlberg
Attorney, Agent, or Firm—Cushman, Darby & Cushman

[57] ABSTRACT

An intake air quantity control apparatus for use in a motor vehicle for controlling an intake air quantity introduced into an engine of the motor vehicle by controlling the opening degree of a throttle valve provided in an air intake passage of the engine. The intake air quantity control apparatus includes a stepping motor connected to the throttle valve and operatively coupled to an accelerating pedal of the motor vehicle so that the stepping motor drives the throttle valve in response to depression of the accelerating pedal. The stepping motor is arranged to be further controllable in response to a control signal from a control unit of the motor vehicle and thus comprising a stator having a plurality of magnetic poles and a plurality of windings respectively wound around the magnetic poles and excited by the control signal, a first rotor rotatable with respect to the stator in response to excitation of said windings of said stator, and a second rotor disposed between the stator and the first rotor. The second rotor is arranged so as not to receive a rotational torque with respect to the stator in response to the excitation of the windings and to allow transmission of magnetic fluxes from the stator to the first rotor.

10 Claims, 3 Drawing Sheets

STEPPING MOTOR AND INTAKE CONTROL APPARATUS THEREWITH

BACKGROUND OF THE INVENTION

The present invention relates generally to an apparatus for controlling the intake air amount of an internal combustion engine, and more particularly to a stepping motor applicable particularly, but not exclusively, to systems for driving an air intake device such as throttle valve to introduce air into an internal combustion engine.

Generally, in internal combustion engines for motor vehicles, a throttle valve is provided in an air intake passage and operatively coupled to an accelerating pedal of the motor vehicle and the engine output is controllable by the opening and closing operation of the throttle valve made in connection with vehicle driver's depressing operation of the accelerating pedal. As a system for preventing a vehicle slip possible when the vehicle is runing on a low running resistance surface such as a frozen road surface is known a so-called traction control system, in which wheel slipping is detected on the basis of signals from wheel speed sensors attached to driven and non-driven wheels of the vehicle and, in response to the detection, the throttle valve is controlled to be operated to the closing direction. This may repress the engine output to enhance the gripping force of the wheel, resulting in prevention of the wheel slipping.

The traction control system generally requires a means for driving the throttle valve independently of the accelerating pedal as described in Japanese Patent Provisional Publication No. 57-116140, for example, where the throttle valve is operatively coupled to a drive motor which is in turn controlled in accordance with the depressing amount of the accelerating pedal, the degree of the wheel slipping and so on. While successfully performing the optimal control of the throttle valve and making easy the constant-speed control of the vehicle, such an apparatus would suffer a problem that the throttle valve is fully opened when the control unit malfunctions. One possible solution would be to use a system as disclosed in European Patent Provisional Publication No. 0089492, in which two throttle valves are provided in a series in an air intake passage, the first valve being driven by the accelerating pedal and the second valve being driven by a drive motor. Normally, the second throttle valve is fully opened and the first throttle valve is operated in accordance with operation of the accelerating pedal. In response to the requirement of the traction control, the second throttle valve is controlled to be closed so that the engine output is reduced irrespective of operation of the first throttle valve to allow the prevention of vehicle slipping. Although satisfactory for improving the reliability of the throttle valve control, this system results in a bulky throttle valve arrangement and difficulty is encountered to mount it on the motor vehicle.

SUMMARY OF THE INVENTION

It is therefore an object of the present invention to provide new and improved stepping motor and intake air quantity control apparatus with the stepping motor for use in a motor vehicle.

A feature of an intake air quantity control apparatus according to the present invention is that intake air quantity control is performed through a stepping motor which is coupled to a throttle valve provided in an air intake passage of an engine of the vehicle and further to an accelerating pedal of the vehicle so that the throttle valve is operated in accordance with depression of the accelerating pedal and which is further controllable in response to a control signal from a traction control unit. The stepping motor comprises an inner rotor and an outer rotor which are resiliently coupled to each other, the inner rotor being connected to the throttle valve and the outer rotor being mechanically coupled to the accelerating pedal. Therefore, in response to depression of the accelerating pedal, the throttle valve can be operated through the outer rotor and the inner rotor. On the other hand, the outer rotor is arranged not to be rotated in response to excitation of a stator of the stepping motor and the inner rotor is arranged to be rotatable due to the exctation thereof. Thus, in response to a control signal from an electronic control unit, only the inner rotor can be rotated independently of operation of the accelerating pedal so as to control the opening degree of the throttle valve, resulting in allowing the traction control. Here, the reacted rotation of the outer rotor due to the rotation of the inner rotor does not occur because the outer rotor is mechanically stopped due to the coupling to the accelerating pedal. In addition, the air intake quantity control apparatus has a fail-safe function against the abnormality of the traction control unit. That is, the rotation of the inner rotor with respect to the outer rotor is restricted by a stopper means so as to prevent the throttle valve from excessively opened due to the abnormality of the traction control unit. The stopper means a stopper pin planted on the outer rotor and a stopper member attached to the inner rotor, which are arranged to come into contact with each other when the inner rotor has been rotated by an amount corresponding to the depressing amount of the accelerating pedal in the throttle valve opening direction. Thus, the rotatable amount of the inner rotor depends upon the depressing amount of the accelerating pedal so that the opening amount of the throttle valve is restricted below the the opening amount corresponding to the pedal depressing amount.

In accordance with the present invention, there is provided a stepping motor comprising: a cylindrical stator having a plurality of magnetic poles and a plurality of windings respectively wound around the magnetic poles, the plurality of magnetic poles being arranged to extend to the axis of the cylindrical stator; a first rotor disposed coaxially with the stator and rotatable with respect to the stator by means of a rotational torque generated in response to excitation of the windings of the stator; and a second cylindrical rotor disposed between the stator and the first rotor and arranged so as not to generate a rotational torque with respect to the stator in response to excitation of the windings and so as to allow transmission of magnetic fluxes from the stator to the first rotor.

In accordance with the present invention, there is further provided an intake air quantity control apparatus for use in a motor vehicle for controlling an intake air quantity introduced into an engine of the motor vehicle by controlling the opening degree of a throttle valve provided in an air intake passage of the engine, comprising a stepping motor connected to the throttle valve and operatively coupled through a link device to an accelerating pedal of the motor vehicle so that the stepping motor drives the throttle valve by an amount corresponding to the operating amount of the accelerating pedal, the stepping motor being further controllable in response to a control signal from a control unit of the motor vehicle and comprising: a cylindrical stator having a plurality of magnetic poles and a plurality of windings respectively wound around the magnetic poles, the plurality of magnetic poles being arranged to extend to the axis of the cylindrical stator and the plurality of windings being excited due to the control signal; a first rotor disposed coaxially with the stator and rotatable with respect to the stator by means of a rotational torque generated in response to excitation of the windings of the stator; and a second cylindrical rotor disposed between the stator and the first rotor and arranged so as not to generate a rotational torque with respect to the stator in response to excitation of the windings and so as to allow transmission of magnetic fluxes from the stator to the first rotor; wherein the second rotor is connected through the link device to the accelerating pedal and the first rotor is resiliently coupled to the second rotor and coupled to the throttle valve.

Preferably, the second rotor of the stepping motor has magnetic portions and non-magnetic portions which are alternatively arranged in the circumferential direction to form a cylindrical configuration, and the number of the magnetic portions is a multiple of the number of the magnetic poles and the first rotor has a plurality of circumferential spaced teeth whose number is not the magnefication of the number of the magnetic poles thereof.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
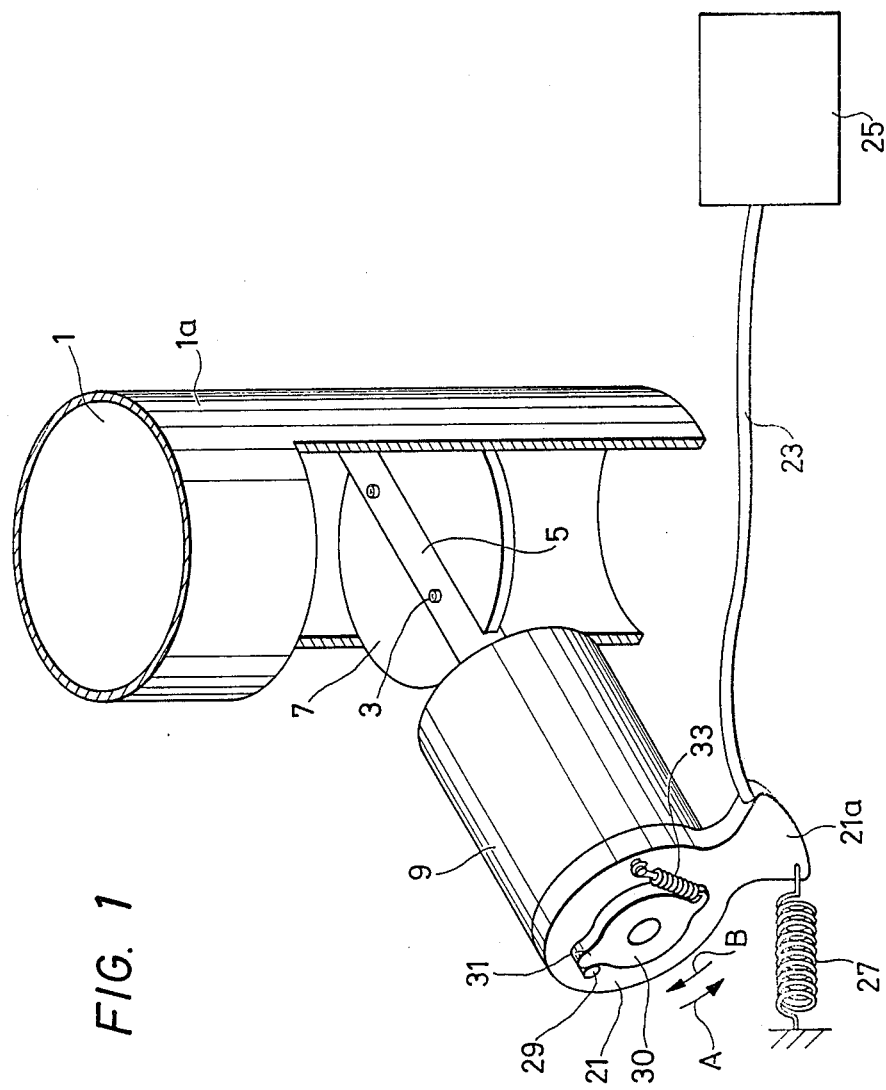
FIG. 1 is a schematical perspective view of an intake air quantity control apparatus according to an embodiment of the present invention which is incorporated into a motor vehicle.
Figure 2:
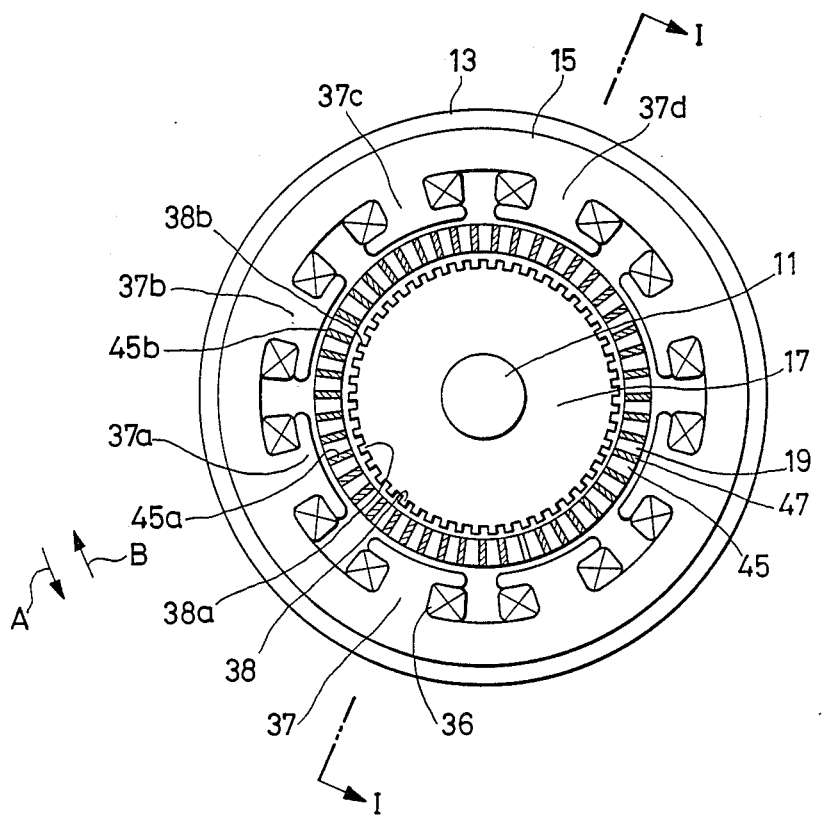
FIG. 2 is a cross-sectional view of a stepping motor used in the intake air quantity control apparatus of FIG. 1.
Figure 3:
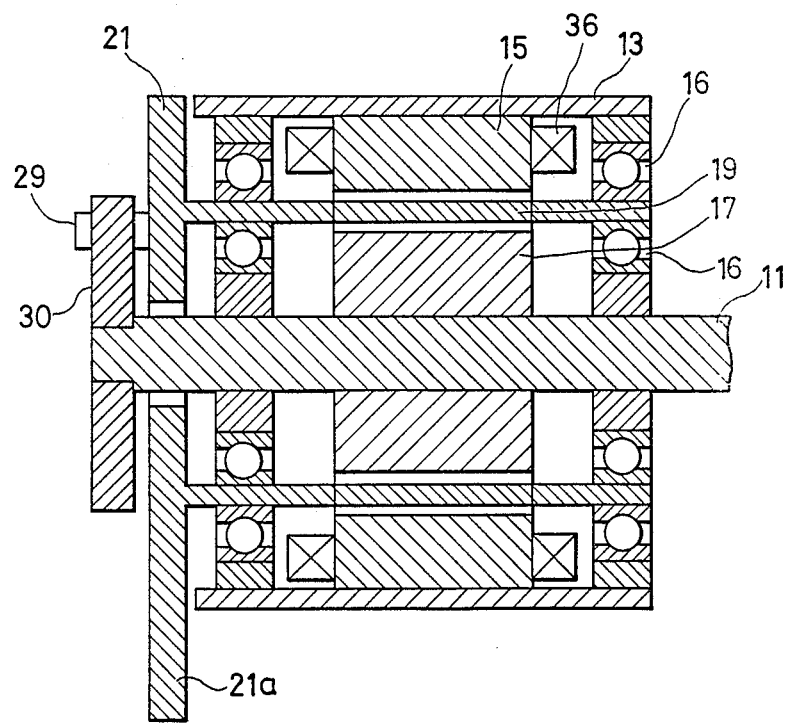
FIG. 3 is a cross-sectional view taken along a line I—I of FIG. 2.

Referring now to FIG. 1, there is illustrated an air intake control system according to an embodiment of the present invention which is connected to a throttle valve 7 provided in an air intake passage 1 which is in turn coupled to an internal combustion engine (not shown) of a motor vehicle. In FIG. 1, the throttle valve 7 is fixedly secured by a screw 3 to a shaft 5, one end of which is pivotally supported by a wall 1a of the air intake passage 1 so that the throttle valve 7 is rotatable about the axis of the shaft 5. The other end of the shaft 5 is integrally connected to an output shaft 11 (FIG. 2) of a stepping motor 9 which may be of the permanent-magnet type and which electromagnetically rotates stepwise. The stepping motor 9, as illustrated in FIGS. 2 and 3, comprises a stator 15, an inner rotor (first rotor) 17 and an outer rotor (second rotor) 19, the stator 15 being fixedly disposed in a cylindrical yoke 13 and the inner and outer rotors 17 and 19 being cylindrically shaped and coaxially arranged so that the outer rotor 19 is interposed between the stator 15 and the inner rotor 17 in spaced relation thereto. The outer rotor 19 is, at one end, connected to a disc member 21 so that the axis of the outer rotor 19 passes through the center of the disc member 21. To the disc member 21 is attached a lever 21a which is in turn coupled through a link device 23 to an accelerating pedal 25 of the motor vehicle and also connected to a return spring 27, the other end of which is connected to a stationary portion. Therefore, when the disc member 21 is rotated in the direction indicated by an arrow A in response to a depression of the accelerating pedal 25, the spring 27 biases the disc member 21 in the opposite direction indicated by an arrow B. On the other hand, the output shaft 11 is inserted into a hole of the inner rotor 17, which is defined in the axial direction thereof, and secured to the inner wall thereof. The other end of the output shaft 11 is connected to a disc member 30 which is positioned in parallel to and outwardly of the disc member 21 connected to the outer rotor 19. To a peripheral portion of the disc member 30 is attached a stopper member 31 which is arranged to allow coming into contact with a stopper pin 29 planted on a surface of the disc member 21. A different peripheral portion of the disc member 30 is coupled through a spring 33 to a portion of the disc member 21 so that the inner rotor 17 and the outer rotor 19 are rotated in the same direction, that is, when the outer rotor 19 is rotated in the throttle valve opening direction indicated by the arrow A, the inner rotor 17 follows in the A-direction.

The stator 15 comprises a laminated core and has stator windings 36 to form magnetic poles 37, i.e., four phases and eight poles. The inner rotor 17 is composed of a laminated core having circumferentially equally spaced teeth 38 whose number is 50. The output shaft 11, i.e., the inner rotor 17, is rotatably supported through bearings 16 and coupled to the shaft 5 of the throttle valve 7. The outer rotor 19, also rotatably supported through the bearings 16, comprises magnetic portions 45, made of a magnetic material such as iron, and non-magnetic portions 47, made of a non-magnetic material such as aluminum and resin, which are arranged alternatively to form a cylindrical configuration as shown in FIGS. 2 and 3. The number of each of the magnetic materials 45 and non-magnetic materials 47 is 48 which is the magnification, or a multiple, of the number of the magnetic poles 37. Therefore, even in the case of switching operation of excitation of the windings 36, the permeance of the outer rotor is not changed and this results in no generation of a torque between the stator 15 and the outer rotor 19. On the other hand, since the number of the magnetic portions 45 of the outer rotor 19 is 48 and the number of the teeth 38 of the inner rotor 17 is 50, the phase difference is $\frac{1}{4}$ pitch whereby the inner rotor 17 exerts a rotational torque with respect to the stator 15 when excitation of the windings 36 are effected to provide rotational magnetic fields. More specifically, the center lines of the magnetic pole 37a, magnetic material 45a and tooth 38a are coincident with each other. On the other hand, although the center lines of the adjacent magnetic pole 37b and magnetic material 45 are coincident with each other, the center line of the tooth 38b is shifted counterclockwise by $45° - (360°/50) \times 6 = 1.8°$ with respect thereto. Therefore, when excitation is performed in terms of the magnetic pole 37a, the inner rotor 17 and the outer rotor 19 are positioned as shown in FIG. 2 and, when the excitation is switched to the magnetic pole 37b, only the inner rotor 17 is rotated clockwise by 1.8° to take the position at which the permeance is the maximum. The inner rotor 17 is further rotated in response to successive exciting of magnetic poles 37c and 37d.

A description will be made hereinbelow in terms of operation of the throttle valve 7 in connection with the stepping motor 9. In response to depression of the accelerating pedal 25, the disc member 21 is rotated in the direction indicated by the arrow A so that the outer rotor 19 is rotated and the inner rotor 17 is also rotated due to the provision of the spring 33 whereby the throttle valve 7 is opened in accordance with the rotation of the shaft 5 connected to the output shaft 11 of the stepping motor 9, enhancing the quantity of intake air into the engine. On the other hand, in response to release of the accelerating pedal 25, the disc member 21 is rotated in the direction indicated by the arrow B by means of the return spring 27 and the inner rotor 17 is similarly rotated by means of the spring 33 to close the throttle valve 7. That is, normally, the throttle valve 7 is controlled directly in accordance with the operation of the accelerating pedal 25. On the other hand, under the traction control performed on the basis of signals from a wheel sensor and so on, the magnetic poles 37 successively generate rotational magnetic fields in response to switching of the excitation. Since the number of the magnetic portions 45 of the outer rotor 19 is set to a multiple of the number of the magnetic poles 37, even if the magnetic poles 37 are successively excited, the pereance between the magnetic poles 37 and the outer rotor 19 is not varied, resulting in no generation of a torque between the stator 15 and the outer rotor 19. The fluxes from the magnetic poles 37 reach the inner rotor 17 after passed through the outer rotor 19. Since the pitches of the magnetic portions 45 and teeth 38 are slightly different to cause the phase differene of ¼ pitch between the successive magnetic poles 37, the permeance between the inner rotor 17 and the outer rotor 19 is varied in response to switching of the exciting and the outer rotor is mechanically stopped by means of the equilibrium between the the depressing force of the accelerating pedal 25 and the biasing force of the return spring 27, resulting in rotation of the inner rotor 17 with respect to the outer rotor 19. Thus, even if the the throttle valve 7 is opened by a given degree in response to depression of the accelerating pedal 25, a rotational torque is applied to the inner rotor 17 which is in turn rotated against the spring 33 to close the throttle valve 7. This results in reduction of the engine output and increase in the gripping force of the wheel. The rotation of the inner rotor 17 with respect to the outer rotor 19 is restricted by means of the stopper pin 29 and the stopper member 31. That is, even in case that the windings 36 are energized to open the throttle valve 7 due to the abnormality of the control unit for the traction control, the inner rotor 17 and the outer rotor 17 are apt to be rotated in the opposite directions due to reaction therebetween and the stopper member 31 comes into contact with the stopper pin 29 to stop the rotation of the inner rotor 17. In this state, since the opening degree of the throttle valve 7 is restricted to be below the opening degree corresponding to the depression of the accelerating pedal 25, the excessive intake of air into the engine can be prevented.

It should be understood that the foregoing relates to only embodiments of the present invention, and that it is intended to cover all changes and modifications of the embodiments of the invention herein used for the purposes of the disclosure, which do not constitute departures from the spirit and scope of the invention. For example, although the above description is made in terms of a four-phase eight-pole VR type stepping motor, the invention is not limited thereto but applicable to stepping motors of different types. Furthermore, although in the above description the outer rotor and inner rotor are connected to each other by means of a spring, it is also appropriate that they are magnetically coupled to each other by always energizing one or more of the stator windings.

What is claimed is:

1. A stepping motor comprising:
   a cylindrical stator having a plurality of magnetic poles and a plurality of windings respectively wound around said magnetic poles, said plurality of magnetic poles being arranged to extend to the axis of said cylindrical stator;
   a first rotor disposed coaxially with said stator and rotatable with respect to said stator by means of a rotational torque generated in response to excitation of said windings of said stator; and
   a second cylindrical rotor disposed between said stator and said first rotor and arranged so as not to generate a rotational torque with respect to said stator in response to excitation of said windings and so as to allow transmission of magnetic fluxes from said stator to said first rotor.

2. A stepping motor as claimed in claim 1, wherein said second rotor has magnetic portions and non-magnetic portions which are alternatively arranged in the circumferential direction to form a cylindrical configuration.

3. A stepping motor as claimed in claim 2, wherein the number of said magnetic portions is a multiple of the number of said magnetic poles and said first rotor has a plurality of circumferential spaced teeth whose number is not a multiple of the number of said magnetic poles thereof.

4. An intake air quantity control apparatus for use in a motor vehicle for controlling an intake air quantity introduced into an engine of said motor vehicle by controlling the opening degree of a throttle valve provided in an air intake passage of said engine, comprising a stepping motor connected to said throttle valve and operatively coupled through a link device to an accelerating pedal of said motor vehicle so that said stepping motor drives said throttle valve by an amount corresponding to the operating amount of said accelerating pedal, said stepping motor being further controllable in response to a control signal from a control unit of said motor vehicle and comprising:
   a cylindrical stator having a plurality of magnetic poles and a plurality of windings respectively wound around said magnetic poles, said plurality of magnetic poles being arranged to extend to the axis of said cylindrical stator and said plurality of windings being excited due to said control signal;
   a first rotor disposed coaxially with said stator and rotatable with respect to said stator by means of a rotational torque generated in response to excitation of said windings of said stator; and
   a second cylindrical rotor disposed between said stator and said first rotor and arranged so as not to generate a rotational torque with respect to said stator in response to excitation of said windings and so as to allow transmission of magnetic fluxes from said stator to said first rotor;

wherein said second rotor is connected through said link device to said accelerating pedal and said first rotor is resiliently coupled to said second rotor and coupled to said throttle valve.

5. An intake air quantity control apparatus as claimed in claim 4, wherein said second rotor of said stepping motor has magnetic portions and non-magnetic portions which are alternatively arranged in the circumferential direction to form a cylindrical configuration.

6. An intake air quantity control apparatus as claimed in claim 5, wherein the number of said magnetic portions is a multiple of the number of said magnetic poles and said first rotor has a plurality of circumferential spaced teeth whose number is not a multiple of the number of said magnetic poles thereof.

7. An intake air quantity control apparatus as claimed in claim 4, further comprising stopper means for restricting the rotation of said first rotor with respect to said second rotor.

8. An intake air quantity control apparatus as claimed in claim 7, wherein said stopper means comprises a stopper member attached to said first rotor and a stopper pin attached to said second rotor which come into contact with each other when said first rotor rotates with respect to said second rotor in the opening direction of said valve.

9. An intake air quantity control apparatus as claimed in claim 4, wherein the resilient coupling between said first rotor and second rotor is performed by a spring.

10. An intake air quantity control apparatus as claimed in claim 4, wherein said second rotor is connected to one end of a spring member, the other end of which is connected to a stationary portion of said motor vehicle, so that said throttle valve returns to its home position in response to the release of said accelerating pedal.

* * * * *